Feb. 24, 1953 P. GALLICE ET AL 2,629,376
INJECTION SYRINGE
Filed July 15, 1949

INVENTORS:
PIERRE GALLICE, PAUL NOGIER &
LOUIS NOGIER
BY

Patented Feb. 24, 1953

2,629,376

UNITED STATES PATENT OFFICE 2,629,376

INJECTION SYRINGE

Pierre Gallice, Riorges, and Paul Nogier and Louis Nogier, Lyon, France, assignors to Societe d'Etudes et d'Applications Techniques S. E. D. A. T., Lyon, France, a limited liability company of France Application July 15, 1949, Serial No. 104,922
In France July 22, 1948

14 Claims. (Cl. 128—218)

The present invention relates to injection syringes.

Known injection syringes are fairly expensive and difficult to manufacture because they must be made with great precision to provide an accurate fit between the outside of the piston and the inside of the cylinder.

One of the objects of the present invention is to provide an injection syringe which may be manufactured at an extremely low cost and by mass production methods.

A further object of the present invention is to provide an injection syringe of the above type which will faithfully provide the desired tightness between the cylinder and piston.

With these objects in view the present invention mainly consists of providing an injection syringe having a piston formed at its inner, free end portion with an annular groove in which an elastic ring is located, this ring being capable of slidably moving into and out of the groove and having, in its unstressed condition, an outer diameter larger than the inner diameter of the cylinder so that the desired tightness is assured by means of this ring.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
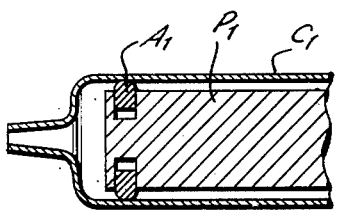
Fig. 1 is a fragmentary, side sectional view of one possible injection syringe constructed in accordance with the present invention.

Referring now to the drawings, the structures shown in the several figures comprise three essential parts, namely, a cylinder made of glass or plastics or any other suitable material, a piston provided with an annular groove adjacent its left end, as viewed in the drawings, and a resilient ring located within this groove of the piston and in its unstressed condition having an outer diameter slightly larger than the inside diameter of the cylinder so that an outer peripheral portion of the ring protrudes from the piston and, by the springy action inherent in the resilient material of the ring, bears constantly and uniformly against the inner wall of the cylinder. This ring which is freely movable into and out of the groove of the piston yieldingly accommodates itself to the irregularities on the inner wall of the cylinder so as to produce, irrespective of such irregularities, the desired tightness.

The open end of the cylinder (not shown) is slightly divergent so as to facilitate the introduction of the piston with the elastic ring thereon into the cylinder, this ring gradually adapting itself to the slightly decreasing diameter of the cylinder as the piston moves into the latter, and this arrangement is very convenient when it is desired to replace worn rings.

The above described features are common to all embodiments of the invention. Referring specifically to the several embodiments, it is seen that in the structure illustrated in Fig. 1, the piston $P_1$ is located in the cylinder $C_1$ with a considerable clearance and supports, for slidable movement into and out of its groove, an elastic ring $A_1$ which has a cylindrical inner annular surface and an outer annular portion having the cross-section of a semi-circle. It will be noted that the inner cylindrical surface of ring $A_1$ is spaced from the bottom cylindrical surface of the groove in piston $P_1$ so that the ring $A_1$ will move toward this bottom surface of the groove upon compression by the cylinder wall.

Figure 2:
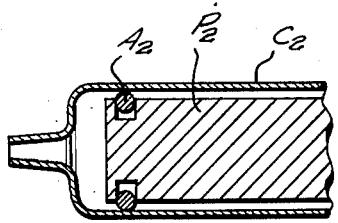
Fig. 2 is a fragmentary, side sectional view of a second possible construction of an injection syringe made in accordance with the present invention.

In the embodiment of Fig. 2, the groove of piston $P_2$ is not as deep as that of the groove of piston $P_1$, and the elastic ring $A_2$ has the cross-section of a circle, this ring $A_2$ also having its inner annular surface spaced from the bottom surface of the groove in the piston $P_2$ so as to be movable toward this bottom surface upon compression of the ring $A_2$ by the wall of the cylinder $C_2$.

Figure 3:
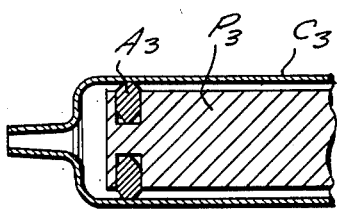
Fig. 3 is a fragmentary, side sectional view of a third possible injection syringe constructed in accordance with the present invention.
Figure 4:
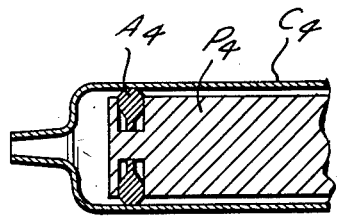
Fig. 4 is a fragmentary, side sectional view of a fourth possible injection syringe constructed in accordance with the present invention.
Figure 5:
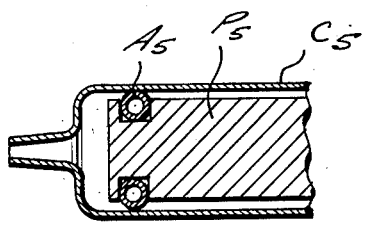
Fig. 5 is a fragmentary, side sectional view of a fifth possible injection syringe constructed in accordance with the present invention.

The embodiments of Figs. 3–5 differ from those of Figs. 1 and 2 in that the elastic rings bear against the bottom surface of the groove in the piston. Thus, in the embodiment of Fig. 3 it is seen that the elastic ring $A_3$ has a polygonal cross-section which provides a cylindrical outer surface to bear against the inner wall of cylinder $C_3$ and which provides the meeting edge between two oppositely inclined annular inner portions of the ring $A_3$ to bear against the bottom cylindrical surface of the groove in the piston $P_3$. There are thus provided two annular free spaces next to the bottom surface of the groove of piston $P_3$ into which the ring $A_3$ may move when the latter is compressed by the wall of cylinder of $C_3$.

The embodiment of Fig. 4 is similar to that of Fig. 3 except that the elastic ring $A_4$ is provided with an inner, annular, flat portion having an inner cylindrical surface located against the bottom cylindrical wall of the groove of piston $P_4$. As is clearly apparent from Fig. 4, this inner annular portion of ring $A_4$ is narrower than the width of the groove of piston $P_4$ so that free spaces are provided into which the ring $A_4$ may be compressed by the inner wall of cylinder $C_4$.

In the embodiment of Fig. 5, the elastic ring $A_5$ takes the form of a hollow, annular tube resting with its inner annular surface against the bottom cylindrical surface of the groove in the piston $P_5$. Thus, with the construction shown in Fig. 5, the ring $A_5$ is yieldably compressible by the inner wall of $C_5$ by reason of the air space within the ring $A_5$ as well as by reason of the annular spaces located between the ring $A_5$ and the bottom surface of the groove in the piston $P_5$, as is clearly shown in Fig. 5.

In the embodiments of Figs. 1, 3, and 4, the rings $A_1$, $A_3$, and $A_4$ each have inner and outer annular portions located apart from each other by a distance greater than the distance between the side walls of the grooves, and the latter have a depth greater than their width.

It will be understood that each of the elements described above, or two or more together, may also find a useful application in other types of injection syringes differing from the types described above.

While the invention has been illustrated and described as embodied in injection syringes having an elastic piston ring bearing against the inner wall of the cylinder of the injection syringe, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An injection syringe, comprising in combination, a tube having an inner, substantially cylindrical surface; a piston having an end portion thereof located within said tube and being formed with an annular groove having a cylindrical bottom surface and two opposite, annular, fixed side walls normal to said bottom surface and extending toward said cylindrical surface of said tube; and resilient ring means loosely mounted in said groove and, in its uncompressed state, having an outer annular portion of a greater diameter than the diameter of said inner surface of said tube, so that said ring means is compressed by the latter, and said ring means having an inner annular portion spaced from said cylindrical bottom surface of said groove.

2. An injection syringe, comprising in combination, a tube having an inner, substantially cylindrical surface; a piston having an end portion thereof located within said tube and being formed with an annular groove having a cylindrical bottom surface and two opposite, annular, fixed side walls normal to said bottom surface and extending toward said cylindrical surface of said tube; and resilient ring means loosely mounted in said groove and, in its uncompressed state, having an outer annular portion of a greater diameter than the diameter of said inner surface of said tube, so that said ring means is compressed by the latter, and said ring means having an inner annular portion spaced from said cylindrical bottom surface of said groove, the distance between said inner and outer annular portions of said ring means being greater than the distance between said side walls of said groove.

3. An injection syringe, comprising in combination, a tube having an inner, substantially cylindrical surface; a piston having an end portion thereof located within said tube and being formed within an annular groove having a cylindrical bottom surface and two opposite, annular, side walls integral with said piston, normal to said bottom surface and extending toward said cylindrical surface of said tube; and resilient ring means loosely mounted in said groove and, in its uncompressed state, having an outer annular portion of a greater diameter than the diameter of said inner surface of said tube, so that said ring means is compressed by the latter, and said ring means having an inner annular portion spaced from said cylindrical bottom surface of said groove.

4. An injection syringe, comprising in combination, a tube having an inner, substantially cylindrical surface; a piston having an end portion thereof located within said tube and being formed with an annular groove having a cylindrical bottom surface and two opposite, annular, side walls integral with said piston, normal to said bottom surface and extending toward said cylindrical surface of said tube, said groove having a depth greater than its width; and resilient ring means loosely mounted in said groove and, in its uncompressed state, having an outer annular portion of a greater diameter than the diameter of said inner surface of said tube, so that said ring means is compressed by the latter, and said ring means having an inner annular portion spaced from said cylindrical bottom surface of said groove.

5. An injection syringe, comprising in combination, a tube having an inner, substantially cylindrical surface; a piston having an end portion thereof located within said tube and being formed with an annular groove having a cylindrical bottom surface and two opposite, annular fixed side walls normal to said bottom surface and extending toward said cylindrical surface of said tube; and resilient ring means loosely mounted in said groove and, in its uncompressed state, having an outer annular portion of a greater diameter than the diameter of said inner surface of said tube, so that said ring means is compressed by the latter, and said ring means having an inner periphery spaced at all parts thereof from said cylindrical bottom surface of said groove.

6. An injection syringe, comprising in combination, a tube having an inner, substantially cylindrical surface; a piston having an end portion thereof located within said tube and being formed with an annular groove having a cylindrical bottom surface and two opposite, annular, fixed side walls normal to said bottom surface and extending toward said cylindrical surface of said tube; and resilient ring means loosely mounted in said groove and, in its uncompressed state, having an outer annular portion of a greater diameter than the diameter of said inner surface of said tube, so that said ring means is compressed by the latter, and said ring means having an inner periphery having opposite side edge portions spaced from said cylindrical bottom surface of said groove.

7. An injection syringe, comprising in combination, a tube having an inner, substantially cylindrical surface; a piston having an end portion thereof located within said tube and being formed with an annular groove having a cylindrical bottom surface and two opposite, annular, fixed side walls normal to said bottom surface and extending toward said cylindrical surface of said tube; and resilient ring means loosely mounted in said groove and, in its uncompressed state, having an outer annular portion of a greater diameter than the diameter of said inner surface of said tube, so that said ring means is compressed by the latter, and said ring means having an inner periphery having opposite side edge portions spaced from said cylindrical bottom surface of said groove and a central portion contacting the latter.

8. An injection syringe, comprising in combination, a tube having an inner, substantially cylindrical surface; a piston having an end portion thereof located within said tube and being formed with an annular groove having a cylindrical bottom surface and two opposite, annular fixed side walls normal to said bottom surface and extending toward said cylindrical surface of said tube; and resilient ring means loosely mounted in said groove and, in its uncompressed state, having an outer annular portion of a greater diameter than the diameter of said inner surface of said tube, so that said ring means is compressed by the latter, and said ring means having an inner cylindrical periphery spaced at all parts thereof from said cylindrical bottom surface of said groove.

9. An injection syringe, comprising in combination, a tube having an inner, substantially cylindrical surface; a piston having an end portion thereof located within said tube and being formed with an annular groove having a cylindrical bottom surface and two opposite, annular, fixed side walls normal to said bottom surface and extending toward said cylindrical surface of said tube; and resilient ring means loosely mounted in said groove, and, in its uncompressed state, having an outer annular portion of a greater diameter than the diameter of said inner surface of said tube, so that said ring means is compressed by the latter, and said ring means having an inner V-shaped periphery having opposite side edge portions spaced from said cylindrical bottom surface of said groove.

10. An injection syringe, comprising in combination, a tube having an inner, substantially cylindrical surface; a piston having an end portion thereof located within said tube and being formed with an annular groove having a cylindrical bottom surface and two opposite, annular, fixed side walls normal to said bottom surface and extending toward said cylindrical surface of said tube; and resilient ring means loosely mounted in said groove, and, in its uncompressed state, having an outer annular portion of a greater diameter than the diameter of said inner surface of said tube, so that said ring means is compressed by the latter, and said ring means having an inner V-shaped periphery having opposite side edge portions spaced from said cylindrical bottom surface of said groove and a central portion contacting the latter.

11. An injection syringe, comprising in combination, a tube having an inner, substantially cylindrical surface; a piston having an end portion thereof located within said tube and being formed with an annular groove having a cylindrical bottom surface and two opposite, annular, fixed side walls normal to said bottom surface and extending toward said cylindrical surface of said tube; and resilient ring means of circular cross-section loosely mounted in said groove and, in its uncompressed state, having an outer annular portion of a greater diameter than the diameter of said inner surface of said tube, so that said ring means is compressed by the latter, and said ring means having an inner periphery having opposite side edge portions spaced from said cylindrical bottom surface of said groove.

12. An injection syringe, comprising in combination, a tube having an inner, substantially cylindrical surface; a piston having an end portion thereof located within said tube and being formed with an annular groove having a cylindrical bottom surface and two opposite, annular, fixed side walls normal to said bottom surface and extending toward said cylindrical surface of said tube; and resilient, hollow ring means of circular cross-section loosely mounted in said groove and, in its uncompressed state, having an outer annular portion of a greater diameter than the diameter of said inner surface of said tube, so that said ring means is compressed by the latter, and said ring means having an inner periphery having opposite side edge portions spaced from said cylindrical bottom surface of said groove.

13. An injection syringe, comprising in combination, a tube having an inner, substantially cylindrical surface; a piston having an end portion thereof located within said tube and being formed with an annular groove having a cylindrical bottom surface and two opposite, annular, fixed side walls normal to said bottom surface and extending toward said cylindrical surface of said tube; and resilient ring means loosely mounted in said groove and, in its uncompressed state, having an outer annular portion of a greater diameter than the diameter of said inner surface of said tube, so that said ring means is compressed by the latter, and said ring means having a pair of inner side annular portions spaced from said cylindrical bottom surface of said groove and a central annular portion contacting said bottom surface of said groove and having opposite side faces spaced from said side walls of said groove.

14. An injection syringe, comprising in combination, a plastic tube having an inner, substantially cylindrical surface; a plastic piston having an end portion thereof located within said tube and being formed with an annular groove having a cylindrical bottom surface and two opposite, annular, fixed side walls normal to said bottom surface and extending toward said cylindrical surface of said tube; and resilient ring means loosely mounted in said groove and, in its uncompressed state, having an outer annular portion of a greater diameter than the diameter of said inner surface of said tube, so that said ring means is compressed by the latter, and said ring means having an inner annular portion spaced from said cylindrical bottom surface of said groove.

PIERRE GALLICE.
PAUL NOGIER.
LOUIS NOGIER.

REFERENCES CITED

The following references are of record in the file of this patent:

UNITED STATES PATENTS

| Number | Name | Date |
|---|---|---|
| 772,450 | Wulfing-Luer | Oct. 18, 1904 |
| 1,157,552 | Kispert | Oct. 19, 1915 |
| 1,508,264 | Armentrout | Sept. 9, 1924 |
| 1,591,226 | Mueller | July 6, 1926 |
| 2,314,683 | Berry | Mar. 23, 1943 |
| 2,419,401 | Hinds | Apr. 22, 1947 |
| 2,438,153 | Dick | Mar. 23, 1948 |

FOREIGN PATENTS

| Number | Country | Date |
|---|---|---|
| 2,164 | Great Britain | Jan. 31, 1901 |
| 19,848 | Great Britain | Aug. 30, 1912 |
| 532,077 | France | Nov. 7, 1921 |
| 632,883 | Germany | July 15, 1936 |